United States Patent
Ma et al.

(10) Patent No.: US 10,643,476 B2
(45) Date of Patent: May 5, 2020

(54) AUXILIARY PARKING METHOD, APPARATUS, AND SYSTEM

(71) Applicant: BOE TECHNOLOGY GROUP CO., LTD., Beijing (CN)

(72) Inventors: Xitong Ma, Beijing (CN); Tianyue Zhao, Beijing (CN); Zhiguo Zhang, Beijing (CN); Qi Zeng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/341,215

(22) PCT Filed: Jul. 24, 2018

(86) PCT No.: PCT/CN2018/096857
§ 371 (c)(1),
(2) Date: Apr. 11, 2019

(87) PCT Pub. No.: WO2019/042047
PCT Pub. Date: Mar. 7, 2019

(65) Prior Publication Data
US 2019/0318628 A1    Oct. 17, 2019

(30) Foreign Application Priority Data
Aug. 30, 2017 (CN) .......................... 2017 1 0764687

(51) Int. Cl.
*G08G 1/16* (2006.01)
*G01S 5/10* (2006.01)
*G06F 3/14* (2006.01)

(52) U.S. Cl.
CPC .............. *G08G 1/168* (2013.01); *G01S 5/10* (2013.01); *G06F 3/14* (2013.01)

(58) Field of Classification Search
CPC .............. G08G 1/168; G01S 5/10; G06F 3/14
See application file for complete search history.

(56) References Cited

U.S. PATENT DOCUMENTS 7,132,981 B1 * 11/2006 Roberts ................ G01C 21/206
                                                              342/442
8,140,209 B2 * 3/2012 Adachi ................ B62D 15/027
                                                              701/23
(Continued)

FOREIGN PATENT DOCUMENTS

CN    101201395 A    6/2008
CN    101727754 A    6/2010
(Continued)

OTHER PUBLICATIONS

International Search Report and Written Opinion dated Oct. 17, 2018.
Chinese Office Action dated Jan. 6, 2020.

*Primary Examiner* — John R Schnurr
(74) *Attorney, Agent, or Firm* — Dilworth & Barrese, LLP.; Michael J. Musella, Esq.

(57) ABSTRACT

Provided is an auxiliary parking method, apparatus and system. The method includes: starting a vehicle image acquisition mode; receiving a plurality of radio frequency signals synchronously transmitted by at least two radio frequency identification transmitters distributed in a parking area in real time; determining a current position of a vehicle in the parking area according to the plurality of radio frequency signals as received; and displaying information identifying a vehicle virtual position to be parked in an image of the vehicle according to the current position of the vehicle in the parking area as determined and at least one available vehicle virtual position in the parking area.

20 Claims, 3 Drawing Sheets

(56) References Cited

U.S. PATENT DOCUMENTS

| | | | |
|---|---|---|---|
| 9,384,664 B2* | 7/2016 | Torii | G08G 1/168 |
| 9,990,849 B2* | 6/2018 | Mielenz | G08G 1/141 |
| 10,170,003 B2* | 1/2019 | Boss | G08G 1/168 |
| 10,210,758 B2* | 2/2019 | Hetz | G08G 1/147 |
| 10,482,766 B2* | 11/2019 | Mowatt | G08G 1/146 |
| 2006/0187043 A1* | 8/2006 | Allen | G06Q 10/087 340/572.1 |
| 2010/0073363 A1* | 3/2010 | Densham | G05B 17/02 345/419 |
| 2011/0298926 A1* | 12/2011 | Katsunaga | B62D 15/027 348/148 |
| 2012/0112929 A1* | 5/2012 | Gupta | G08G 1/146 340/932.2 |
| 2014/0057237 A1 | 2/2014 | Chen | |
| 2014/0176348 A1* | 6/2014 | Acker, Jr. | G08G 1/144 340/932.2 |
| 2015/0309156 A1* | 10/2015 | Chua | G06K 7/10009 342/451 |
| 2016/0068157 A1* | 3/2016 | Wayman | B60W 30/00 701/1 |
| 2016/0140846 A1* | 5/2016 | Outwater | G08G 1/144 340/932.2 |
| 2016/0180712 A1* | 6/2016 | Rosen | G08G 1/015 705/5 |
| 2016/0189324 A1* | 6/2016 | Eramian | G06Q 50/30 705/13 |
| 2016/0284217 A1* | 9/2016 | Lee | B62D 15/0285 |
| 2017/0154530 A1 | 6/2017 | Irion et al. | |
| 2018/0001930 A1* | 1/2018 | Sham | B60W 30/06 |
| 2018/0025143 A1* | 1/2018 | Chuang | G07B 15/00 340/5.52 |
| 2018/0173908 A1* | 6/2018 | Pretorius | H01Q 1/3225 |
| 2018/0211519 A1* | 7/2018 | Khojastepour | G01S 13/75 |
| 2018/0286240 A1* | 10/2018 | Harai | B60W 30/06 |
| 2018/0315313 A1* | 11/2018 | Klochikhin | G08G 1/146 |
| 2018/0374004 A1* | 12/2018 | Eone | G06Q 10/02 |
| 2019/0012856 A1* | 1/2019 | Chang | G07C 9/00071 |
| 2019/0019407 A1* | 1/2019 | Nakhjavani | G08G 1/0137 |
| 2019/0061741 A1* | 2/2019 | Turner | G05D 1/0088 |
| 2019/0066514 A1* | 2/2019 | Yamamura | G08G 1/143 |
| 2019/0276010 A1* | 9/2019 | Mason | B60W 30/06 |
| 2019/0371175 A1* | 12/2019 | Joos | H04W 4/38 |

FOREIGN PATENT DOCUMENTS

| | | | | |
|---|---|---|---|---|
| CN | 101201395 | B | 5/2011 | |
| CN | 102910166 | A | 2/2013 | |
| CN | 103661369 | A | 3/2014 | |
| CN | 104851315 | A | 8/2015 | |
| CN | 105059286 | A | 11/2015 | |
| CN | 105321213 | A | 2/2016 | |
| CN | 106205136 | A | 12/2016 | |
| CN | 106297317 | A | 1/2017 | |
| CN | 106489173 | A | 3/2017 | |
| CN | 106864369 | A | 6/2017 | |
| DE | 102006040879 | A1 * | 3/2008 | B60D 1/62 |
| EP | 1522460 | A1 | 4/2005 | |
| JP | 2013035327 | A | 2/2013 | |
| JP | 5545238 | B2 | 7/2014 | |

* cited by examiner

AUXILIARY PARKING METHOD, APPARATUS, AND SYSTEM

TECHNICAL FIELD

The present disclosure relates to an auxiliary parking method, an auxiliary parking apparatus, and an auxiliary parking system.

BACKGROUND

At present, in some temporary parking occasions, there is no fixed parking space line, which is prone to result in the problem of irregular parking and waste of space. Or, in some parking areas, although a fixed parking space line is planned, vehicles that have been parked are not regularly placed, that is, they are not parked in the fixed parking space line, which leads to the problem that the existing fixed parking spaces cannot be fully and effectively utilized, thus causing waste of space.

SUMMARY

In view of this, embodiments of the present disclosure provide an auxiliary parking method, an auxiliary parking apparatus, and an auxiliary parking system, to solve the problem of waste of parking space in existing parking lots.

At least one embodiment according to the present disclosure provides an auxiliary parking method, including:

starting a vehicle image acquisition mode;

receiving a plurality of radio frequency signals synchronously transmitted by at least two radio frequency identification transmitters distributed in a parking area in real time;

determining a current position of a vehicle in the parking area according to the plurality of radio frequency signals as received; and displaying information identifying a vehicle virtual position to be parked in an image of the vehicle according to the current position of the vehicle in the parking area as determined and at least one available vehicle virtual position in the parking area.

For example, in the auxiliary parking method provided by the embodiment of the present disclosure, the number of the radio frequency identification transmitters is greater than two, determining the current position of the vehicle in the parking area according to the plurality of radio frequency signals as received includes:

determining signal receiving time differences between a first one of the plurality of radio frequency signals as received and subsequent ones of the plurality of radio frequency signals as received among the plurality of radio frequency signals synchronously transmitted by the at least two radio frequency identification transmitters; and determining the current position of the vehicle in the parking area according to the signal receiving time differences as determined.

For example, in the auxiliary parking method provided by the embodiment of the present disclosure, the plurality of radio frequency signals include identification information of the at least two radio frequency identification transmitters;

determining the current position of the vehicle in the parking area according to the signal receiving time differences as determined includes:

determining distance differences between the current position of the vehicle and the at least two radio frequency identification transmitters corresponding to the signal receiving time differences according to the signal receiving time differences as determined and identification information of the at least two radio frequency identification transmitters;

determining hyperbolas corresponding to the distance differences according to position information corresponding to the identification information of the at least two radio frequency identification transmitters of the plurality of radio frequency signals and according to the distance differences; and taking an average value of intersection positions of the hyperbolas corresponding to the distance differences as the current position of the vehicle.

For example, in the auxiliary parking method provided by the embodiment of the present disclosure, the plurality of radio frequency signals further include sending time identification information of the at least two radio frequency identification transmitters, determining the current position of the vehicle in the parking area according to the plurality of radio frequency signals as received includes:

determining signal receiving times of the plurality of radio frequency signals as received;

determining signal transmission times of the plurality of radio frequency signals according to the sending time identification information of the at least two radio frequency identification transmitters included in the plurality of radio frequency signals and according to the signal receiving times of the plurality of radio frequency signals; and determining the current position of the vehicle according to the signal transmission times of the plurality of radio frequency signals as determined.

For example, in the auxiliary parking method provided by the embodiment of the present disclosure, determining the current position of the vehicle according to the signal transmission times of the plurality of radio frequency signals as determined includes:

determining transmission distances of the plurality of radio frequency signals according to the signal transmission times of the plurality of radio frequency signals as determined;

determining circular arc curves corresponding to the plurality of radio frequency signals by taking position information corresponding to identification information of the plurality of radio frequency identification transmitter of the plurality of radio frequency signals as origins and by taking the transmission distances of the plurality of radio frequency signals as radiuses; and taking an average value of intersection positions of the circular arc curves corresponding to the plurality of radio frequency signals as the current position of the vehicle.

For example, in the auxiliary parking method provided by the embodiment of the present disclosure, determining the current position of the vehicle in the parking area according to the plurality of radio frequency signals as received includes:

determining current positions of a head portion and a tail portion of the vehicle in the parking area according to the plurality of radio frequency signals received by the head portion and the tail portion of the vehicle.

For example, the auxiliary parking method provided by the embodiment of the present disclosure further includes:

determining a central axis of the vehicle according to the current positions of the head portion and the tail portion of the vehicle in the parking area; and displaying an identification offset line of the vehicle with relative to the vehicle virtual position to be parked in the image of the vehicle according to the central axis of the vehicle and the vehicle virtual position to be parked.

At least one embodiment according to the present disclosure provides an auxiliary parking apparatus, including:

a camera, configured to acquire an image of a vehicle upon a vehicle image acquisition mode being started;

a radio frequency tag, configured to receive a plurality of radio frequency signals synchronously transmitted by a plurality of radio frequency identification transmitters distributed in a parking area in real time upon determining that the vehicle image acquisition mode is started; and a processor, configured to start the vehicle image acquisition mode, determine a current position of the vehicle in the parking area according to the plurality of radio frequency signals as received, and display information identifying a vehicle virtual position to be parked in an image of the vehicle according to the current position of the vehicle in the parking area as determined and at least one available vehicle virtual position in the parking area.

In the auxiliary parking apparatus provided by the embodiment of the present disclosure, upon the number of the radio frequency identification transmitters being greater than two, the processor is further configured to determine signal receiving time differences between a first one of the plurality of radio frequency signals as received and subsequent ones of the plurality of radio frequency signals as received among the plurality of radio frequency signals synchronously transmitted by the plurality of radio frequency identification transmitters.

In the auxiliary parking apparatus provided by the embodiment of the present disclosure, the radio frequency signal includes: identification information of the radio frequency identification transmitter;

wherein the processor is further configured to: determine distance differences between the current position of the vehicle and the plurality of radio frequency identification transmitters corresponding to the signal receiving time differences according to the signal receiving time differences as determined and identification information of the plurality of radio frequency identification transmitters; determine hyperbolas corresponding to the distance differences according to position information corresponding to the identification information of the plurality of radio frequency identification transmitters of the plurality of radio frequency signals and according to the distance differences; and taking an average value of intersection positions of the hyperbolas corresponding to the distance differences as the current position of the vehicle.

In the auxiliary parking apparatus provided by the embodiment of the present disclosure, upon the number of the plurality of radio frequency identification transmitters being greater than one and the plurality of radio frequency signals comprising sending time identification information of the plurality of radio frequency identification transmitters, the processor is further configured to: determine signal receiving times of the plurality of radio frequency signals as received; determine signal transmission times of the plurality of radio frequency signals according to the sending time identification information of the plurality of radio frequency identification transmitters included in the plurality of radio frequency signals and according to the signal receiving times of the plurality of radio frequency signals; and determine the current position of the vehicle according to the signal transmission times of the plurality of radio frequency signals as determined.

In the auxiliary parking apparatus provided by the embodiment of the present disclosure, the processor is further configured to: determine transmission distances of the plurality of radio frequency signals according to the signal transmission times of the plurality of radio frequency signals as determined; determine circular arc curves corresponding to the plurality of radio frequency signals by taking position information corresponding to identification information of the plurality of radio frequency identification transmitters of the plurality of radio frequency signals as origins and by taking the transmission distances of the plurality of radio frequency signals as radiuses; and take an average value of intersection positions of the circular arc curves corresponding to the plurality of radio frequency signals as the current position of the vehicle.

In the auxiliary parking apparatus provided by the embodiment of the present disclosure, the radio frequency tag is located at a head portion and a tail portion of the vehicle, respectively; the processor is configured to determine current positions of the head portion and the tail portion of the vehicle in the parking area according to the plurality of radio frequency signals received by the head portion and the tail portion of the vehicle.

In the auxiliary parking apparatus provided by the embodiment of the present disclosure, the processor is further configured to: determine a central axis of the vehicle according to the current positions of the head portion and the tail portion of the vehicle in the parking area; and display an identification offset line of the vehicle with relative to the vehicle virtual position to be parked in the image of the vehicle according to the central axis of the vehicle and the vehicle virtual position to be parked.

At least one embodiment according to the present disclosure provides an auxiliary parking system, including: the abovementioned auxiliary parking apparatus disposed in a vehicle, and a plurality of radio frequency identification transmitters distributed in a parking area.

DETAILED DESCRIPTION

Hereinafter, detailed embodiments of the auxiliary parking method, apparatus and system provided by the embodiments of the present disclosure will be described, in details, with reference to the accompanying drawings.

Figure 1:
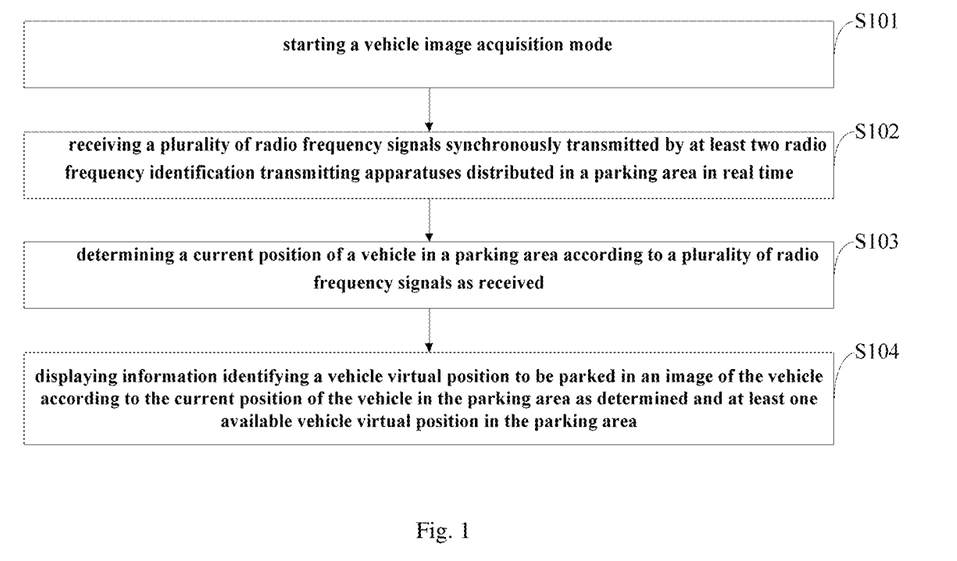
FIG. 1 is a flowchart of an auxiliary parking method provided by an embodiment of the present disclosure.

An auxiliary parking method provided by an embodiment of the present disclosure, as illustrated by FIG. 1, may include the following steps:

S101: starting a vehicle image acquisition mode;

S102: receiving a plurality of radio frequency signals synchronously transmitted by at least two radio frequency identification transmitters distributed in a parking area in real time;

S103: determining a current position of a vehicle in the parking area according to the plurality of radio frequency signals as received;

S104: displaying information identifying a vehicle virtual position to be parked in an image of the vehicle according to the current position of the vehicle in the parking area as determined and at least one available vehicle virtual position in the parking area.

In an example, the radio frequency signal in step S102 includes identification information of the radio frequency identification transmitter.

In an example, the at least one available vehicle virtual position in step S104 may include all available vehicle virtual positions.

For example, in the above-mentioned auxiliary parking method provided by the embodiment of the present disclosure, upon determining that the vehicle image acquisition mode is started, the plurality of radio frequency signals synchronously transmitted by the at least two radio frequency identification transmitters distributed in the parking area are received in real time, and the radio frequency signals include identification information of the radio frequency identification transmitting apparatuses; after that, the current position of the vehicle in the parking area can be determined according to the radio frequency signals as received; then the current position of the vehicle in the parking area can be determined according to the radio frequency signals as received; finally, the information identifying the vehicle virtual position to be parked is displayed in the image of the vehicle according to the current position of the vehicle in the parking area as determined and all available vehicle virtual positions in the parking area as predetermined, so as to achieve the effect of guiding a driver of the vehicle to carry out standard parking according to the information of the vehicle virtual position, and hence to make full use of the space in the parking area.

According to an example of the present disclosure, in the above-mentioned auxiliary parking method provided by the embodiment of the present disclosure, starting the vehicle image acquisition mode in step S101 may be enabling a camera of the vehicle to acquire an image. According to different vehicle models and configurations, a camera arranged at a tail portion of the vehicle may be used to acquire an image behind the vehicle so that the driver can back the vehicle in a parking space according to the image. It is also possible to use cameras (including but not limited to a front camera, a side camera and a rear camera) arranged around the vehicle to acquire a panoramic image of 360 degrees formed by images around the vehicle, so that the driver can advance or back the vehicle in the parking space according to the image. That is to say, upon determining that the vehicle image acquisition mode is started in step S101, it can be considered that the driver of the vehicle may need to park the vehicle in the parking space, and then the following steps S102 to S104 can be executed.

Figure 2:
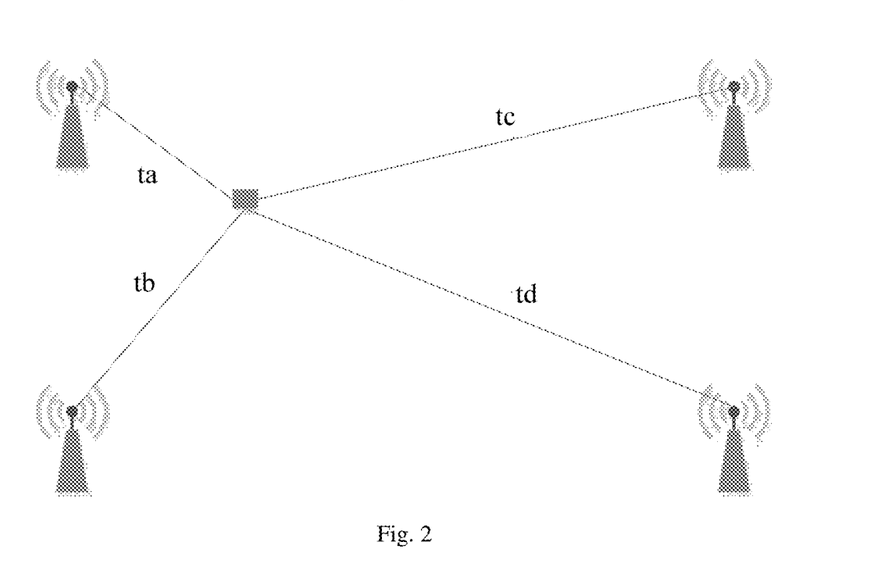
FIG. 2 is a schematic diagram of a radio frequency identification transmitter and a vehicle position in an auxiliary parking method provided by an embodiment of the present disclosure.

According to an example of the present disclosure, in the above-mentioned auxiliary parking method provided by the embodiment of the present disclosure, positions of the radio frequency identification transmitters disposed in the parking area may be determined according to the size of the parking area. For example, generally, in the case where the parking area has a regular rectangle shape as illustrated by FIG. 2, the radio frequency identification transmitters may be disposed at four corner positions of the parking area, respectively, so that radio frequency signals transmitted by the radio frequency identification transmitters may cover every vehicle in the parking area. Moreover, in order to be able to determine the current position of the vehicle according to the radio frequency signals transmitted by the radio frequency identification transmitters, at least two radio frequency signals can be used for positioning; therefore, at least two radio frequency identification transmitters should be arranged in the parking area, and there should be a certain distance between the radio frequency identification transmitters.

Furthermore, a radio frequency signal transmitted by each of the radio frequency identification transmitters should include identification information of the radio frequency identification transmitter. The identification information may be an identification code of the radio frequency identification transmitter to identify the unique identity of the radio frequency identification transmitter; the identification information may also be geographic position information or coordinate information of the radio frequency identification transmitter to identify the unique identity of the radio frequency identification transmitter.

In addition, because a radio frequency signal transmitting function of the radio frequency identification transmitter is generally controlled by a manager of the parking area, under normal circumstances, the radio frequency identification transmitter will transmit radio frequency signals at a preset time interval. The time when receiving the radio frequency signal is varied depending on a distance between the vehicle in the parking area and the radio frequency identification transmitter. In order to prevent the vehicle in the parking area from being unable to distinguish the synchronized relationship between the radio frequency signals as received, generally, the radio frequency signal needs to carry synchronization identification information of the radio frequency signal; for example, the synchronization identification information may be a time node of synchronized transmitting or may be identification information indicative of the number of times of synchronized transmitting, as long as the synchronized relationship of the radio frequency signals can be indicated.

Correspondingly, in the above-mentioned auxiliary parking method provided by the embodiment of the present disclosure, a radio frequency tag is placed or installed in the vehicle to receive radio frequency signals transmitted by the radio frequency identification transmitters. In addition, there may be one or two or more than two radio frequency tags in the vehicle. In the case where there are two radio frequency tags, the two radio frequency tags are generally located at a head portion and a tail portion of the vehicle, respectively, so as to accurately locate the head portion and the tail portion of the vehicle.

According to an example of the present disclosure, in the above-mentioned auxiliary parking method provided by the embodiment of the present disclosure, in the case where the number of radio frequency identification transmitters in the parking area is greater than two, step S103 of determining the current position of the vehicle in the parking area according to the radio frequency signals as received can be realized by following ways.

Firstly, signal receiving time differences between a first one of the plurality of radio frequency signals as received and subsequent ones of the plurality of radio frequency signals as received are determined, among the plurality of radio frequency signals as received which are synchronously transmitted by a plurality of radio frequency identification transmitters.

Figure 3:
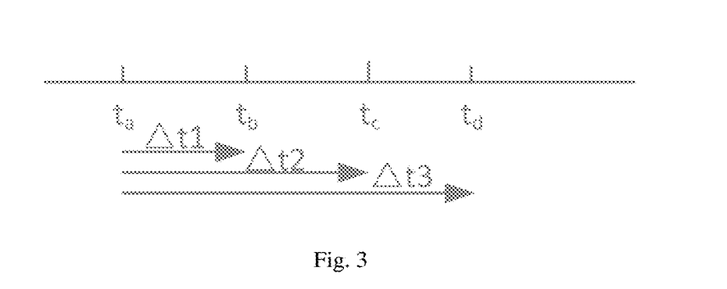
FIG. 3 is a schematic diagram of calculating a time difference in the auxiliary parking method provided by an embodiment of the present disclosure.

For example, taking the parking area illustrated by FIG. 2 as an example, a box in the middle represents the vehicle. In this case, because the distance between the vehicle and the radio frequency identification transmitter varies with the radio frequency identification transmitter, a signal receiving time is also varied with the radio frequency identification transmitter. Upon the radio frequency tag receiving a first one of the radio frequency signals which are synchronously transmitted, as illustrated by FIG. 3, a signal receiving time is recorded as ta, a timer is enabled to start timing, and then signal receiving times tb, tc and td are recorded upon receiving other radio frequency signals which are synchronously transmitted, such that signal receiving time differences $\Delta t1$, $\Delta t2$ and $\Delta t3$ between the first one of the plurality of radio frequency signals as received and the subsequent ones of the plurality of radio frequency signals as received can be obtained.

After that, the current position of the vehicle is determined according to the signal receiving time differences as determined.

Figure 4:
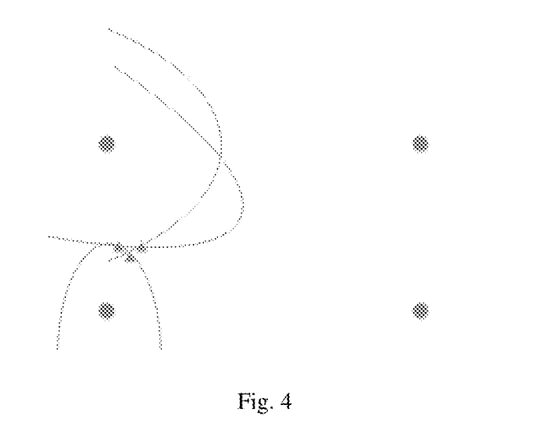
FIG. 4 is a schematic diagram of determining the vehicle position in the auxiliary parking method provided by an embodiment of the present disclosure.

For example, firstly, distance differences between the current position of the vehicle and the radio frequency identification transmitters corresponding to the signal receiving time differences are determined according to the signal receiving time difference as determined and identification information of the radio frequency identification transmitters; i.e., time differences are converted into distance differences. Then, hyperbolas corresponding to the distance differences can be determined according to position information corresponding to the identification information of the radio frequency identification transmitters of the radio frequency signals and according to the distance differences. As illustrated by FIG. 4, three hyperbolas can be drawn. Finally, an average value of intersection positions of the hyperbolas corresponding to the distance differences is taken as the current position of the vehicle. That is, theoretically, the three hyperbolas are supposed to be intersected at one point, but considering the actual error, the three hyperbolas may intersect at multiple points; coordinates of the multiple intersection points are obtained, distances between the multiple intersection points are calculated, and an average value of coordinates of three intersection points (represented by the triangles in FIG. 4) having smaller distances than others among the multiple intersection points is taken as a coordinate value of the current position of the vehicle.

According to an example of the present disclosure, in the above-mentioned auxiliary parking method provided by the embodiment of the present disclosure, the implementation of the step S103 of determining the current position of the vehicle in the parking area according to the radio frequency signals as received is not limited to that described above, but may also adopt other ways.

For example, in the case where the number of radio frequency identification transmitters in the parking area is greater than one, the radio frequency signals may further include sending time identification information of the radio frequency identification transmitters; that is, the time moments of sending the radio frequency signals out. In this case, step S103 of determining the current position of the vehicle in the parking area according to the radio frequency signals as received can be realized by the following ways.

Firstly, signal receiving times of the radio frequency signals are determined.

Then, signal transmission times of the radio frequency signals are determined according to the sending time identification information of the radio frequency identification transmitters included in the radio frequency signals and according to the signal receiving times of the radio frequency signals. Because a distance between the vehicle and the radio frequency identification transmitter varies with the radio frequency identification transmitter, a time when receiving the radio frequency signal and a signal transmission time of the radio frequency signal are also varied with the radio frequency identification transmitter.

Finally, the current position of the vehicle is determined according to the signal transmission times of the radio frequency signals as determined.

For example, firstly, signal transmission distances of the radio frequency signals can be determined according to the signal transmission times of the radio frequency signals as determined, that is, the transmission times are converted into transmission distances; after that, circular arc curves corresponding to the plurality of radio frequency signals are determined by taking position information corresponding to identification information of the plurality of radio frequency identification transmitters of the plurality of radio frequency signals as origins and by taking the transmission distances of the plurality of radio frequency signals as radiuses. Finally, an average value of intersection positions of the circular arc curves corresponding to the radio frequency signals is taken as the current position of the vehicle. That is to say, theoretically, the circular arc curves are supposed to be intersected at one point, but considering the actual error, the circular arc curves may be intersected at multiple points. Then, coordinates of the multiple intersection points are obtained, distances between the multiple intersection points are calculated, and an average value of coordinates of three intersection points having smaller distances than others among the multiple intersection points is taken as a coordinate value of the current position of the vehicle.

According to an example of the present disclosure, in the above-mentioned auxiliary parking method provided by the embodiment of the present disclosure, after determining the current position of the vehicle in the parking area by step S103 and before executing step S104, a processor of the vehicle can ask a management system of the parking area for information of all available vehicle virtual positions; the information of vehicle virtual positions is obtained by calculating positions of parked vehicles in the parking area, and can be updated and changed according to the position information of the parked vehicles so as to optimize the parking spaces in the parking area. When executing step S104, several vehicle virtual positions adjacent to the current position of the vehicle, among all available vehicle virtual positions in the parking area as predetermined, may be determined as the positions to be parked, and then information identifying the vehicle virtual positions to be parked may be displayed in the image of the vehicle.

Furthermore, according to an example of the present disclosure, in the above-mentioned auxiliary parking method provided by the embodiment of the present disclosure, in the case where radio frequency tags are respectively provided at the head portion and tail portion of the vehicle, step S103 of determining the current position of the vehicle in the parking area according to the radio frequency signals as received can be realized by the following ways.

The current positions of the head portion and the tail portion of the vehicle in the parking area are determined respectively according to the radio frequency signals received by the head portion and the tail portion of the vehicle.

Figure 5:
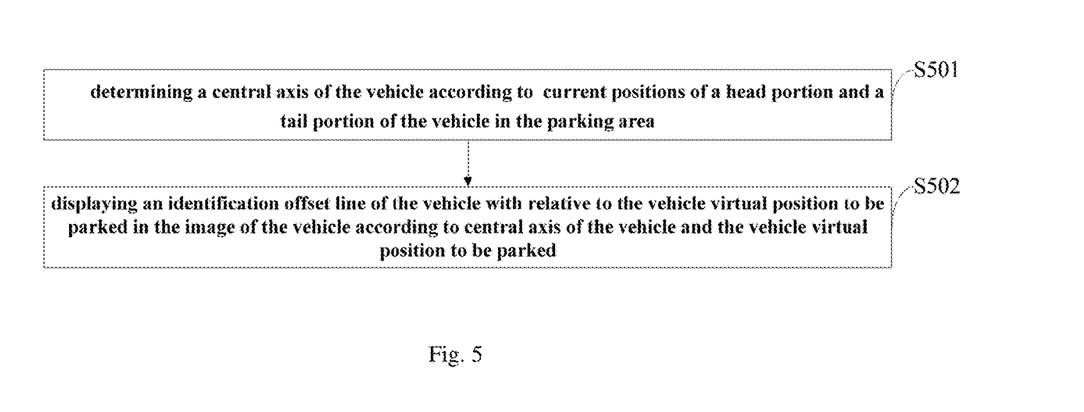
FIG. 5 is another flowchart of an auxiliary parking method according to an embodiment of the present disclosure.

According to an example of the present disclosure, in the above-mentioned auxiliary parking method provided by the embodiment of the present disclosure, after determining the current positions of the head portion and tail portion of the vehicle, for example, a coordinate of the head portion of the vehicle is (x1, y1) and a coordinate of the tail portion of the vehicle is (x2, y2), in order to facilitate guiding a driver of the vehicle to park the vehicle in a desired vehicle virtual position, as illustrated by FIG. 5, the following steps may be further included.

S501: determining a central axis of the vehicle according to the current positions of the head portion and the tail portion of the vehicle in the parking area.

S502: displaying an identification offset line of the vehicle with relative to the vehicle virtual position to be parked in the image of the vehicle according to the central axis of the vehicle and the vehicle virtual position to be parked.

Figure 6:
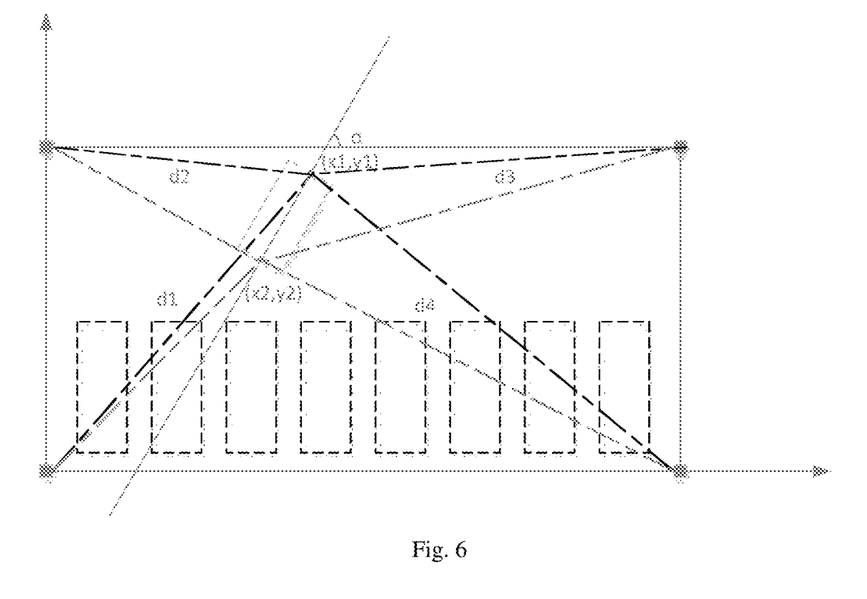
FIG. 6 is another schematic diagram of determining the vehicle position in the auxiliary parking method provided by an embodiment of the present disclosure.
Figure 7:
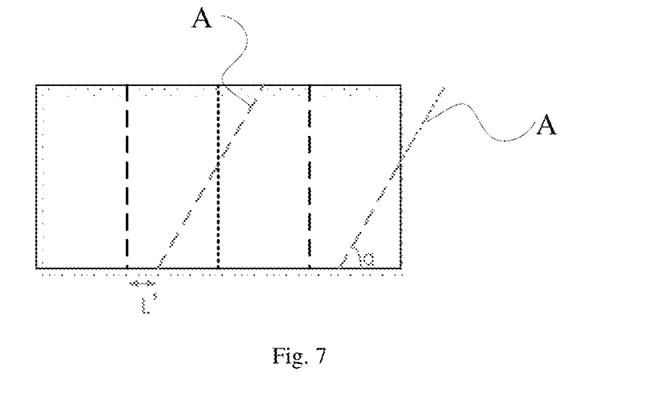
FIG. 7 is a schematic diagram of determining an identification offset line in the auxiliary parking method provided by an embodiment of the present disclosure.

For example, as illustrated by FIG. 6, according to the coordinate (x1, y1) of the head portion of the vehicle and the coordinate (x2, y2) of the tail portion of the vehicle, the central axis of the vehicle can be determined, a vertical distance L from a coordinate of a rear view camera to a central axis of the parking space can be calculated, and an included angle α between the central axis of the vehicle and a horizontal line of the parking space can be calculated. An identification offset line A of the vehicle with relative to the vehicle virtual position to be parked can be calculated in the image of the vehicle according to the vertical distance L and the angle α. As illustrated by FIG. 7, L' is calculated from L according to an image scale. During a process of backing the vehicle in the parking space, the identification offset line A gradually moves closer to a standard line (i.e., the identification offset line A is parallel to both sides of the parking space, and a center line of the standard line coincides with a center line of the parking space), and the angle α gradually approaches 90 degrees. Upon the identification offset line A coinciding with the standard line within an allowable error, it indicates that an owner of the vehicle has parked the vehicle according to the regulations, otherwise the owner of the vehicle will be notified for adjustments.

Based on the same inventive concept, an embodiment of the present disclosure also provides an auxiliary parking apparatus and an auxiliary parking system. Because the principle of the apparatus and the system to solve the problem is similar to that of the above-mentioned auxiliary parking method, the implementation of the apparatus and system may be referred to the implementation of the method, and the repeated portions are omitted herein.

Figure 8:
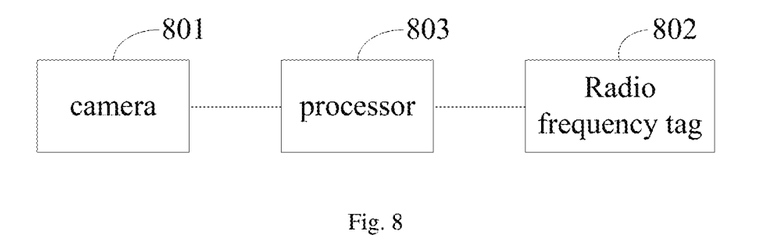
FIG. 8 is a structural diagram of an auxiliary parking apparatus provided by an embodiment of the present disclosure.

For example, an auxiliary parking apparatus provided by an embodiment of the present disclosure is disposed inside a vehicle, as illustrated by FIG. 8, and includes the following.

A camera 801, configured to acquire an image of a vehicle upon a vehicle image acquisition mode being started. For example, the camera 801 may be a depth camera, a binocular camera, or the like.

A radio frequency tag 802, configured to receive a plurality of radio frequency signals synchronously transmitted by a plurality of radio frequency identification transmitters distributed in a parking area in real time upon determining that the vehicle image acquisition mode is started. For example, the radio frequency signals include identification information of the radio frequency identification transmitters. For example, the radio frequency tag 802 may be an active radio frequency tag, a passive radio frequency tag, a semi-active radio frequency tag, or the like.

A processor 803, configured to: start the vehicle image acquisition mode, determine a current position of the vehicle in the parking area according to the plurality of radio frequency signals as received, and display information of vehicle virtual position to be parked in an image of the vehicle according to the current position of the vehicle in the parking area as determined and at least one available vehicle virtual position or all available vehicle virtual positions in the parking area. For example, the processor 803 may be a general purpose processor, such as a central processing unit CPU, or may be a special purpose processor, such as a programmable logic circuit (PLD), a field programmable gate array (FPGA), or the like.

According to an example of the present disclosure, in the auxiliary parking apparatus provided in the embodiment of the present disclosure, the processor 803 is further configured to: determine signal receiving time differences between a first one of the plurality of radio frequency signals as received and subsequent ones of the plurality of radio frequency signals as received among the plurality of radio frequency signals synchronously transmitted by the plurality of radio frequency identification transmitters upon the number of radio frequency identification transmitters being greater than two; and determine the current position of the vehicle according to the signal receiving time differences as determined.

Alternatively, according to an example of the present disclosure, in the auxiliary parking apparatus provided by the embodiment of the present disclosure, the processor 803 is further configured to: determine distance differences between the current position of the vehicle and the radio frequency identification transmitters corresponding to the signal receiving time differences according to the signal receiving time differences as determined and according to identification information of the plurality of radio frequency identification transmitters; determine hyperbolas corresponding to the distance differences according to position information corresponding to the identification information of the plurality of radio frequency identification transmitters of the plurality of radio frequency signals and according to the distance differences; and taking an average value of intersection positions of the hyperbolas corresponding to the distance differences as the current position of the vehicle.

According to an example of the present disclosure, in the auxiliary parking apparatus provided by the embodiment of the present disclosure, the processor 803 is further configured to: determine signal receiving times of the plurality of radio frequency signals as received upon the number of the radio frequency identification transmitters being greater than one and the radio frequency signals further including sending time identification information of the radio frequency identification transmitters; determine signal transmission times of the plurality of radio frequency signals according to the sending time identification information of the radio frequency identification transmitters included in the plurality of radio frequency signals and according to the signal receiving times of the plurality of radio frequency signals; and determine the current position of the vehicle according to the signal transmission times of the plurality of radio frequency signals as determined.

According to an example of the present disclosure, in the auxiliary parking apparatus provided in the embodiment of the present disclosure, the processor 803 is further configured to: determine transmission distances of the plurality of radio frequency signals according to the signal transmission times of the plurality of radio frequency signals as determined; determine circular arc curves corresponding to the plurality of radio frequency signals by taking position information corresponding to identification information of the plurality of radio frequency identification transmitters of the plurality of radio frequency signals as origins and taking the transmission distances of the plurality of radio frequency signals as radiuses; and take an average value of intersection positions of the circular arc curves corresponding to the plurality of radio frequency signals as the current position of the vehicle.

According to an example of the present disclosure, in the above-mentioned auxiliary parking apparatus provided by the embodiment of the present disclosure, radio frequency tags 802 are respectively located at a head portion and a tail portion of the vehicle.

The processor 803 is further configured to determine current positions of the head portion and the tail portion of the vehicle in the parking area according to the plurality of radio frequency signals received by the head portion and the tail portion of the vehicle.

According to an example of the present disclosure, in the auxiliary parking apparatus provided by the embodiment of the present disclosure, the processor 803 is further configured to determine a central axis of the vehicle according to the current positions of the head portion and the tail portion of the vehicle as determined in the parking area; and display an identification offset line of the vehicle with relative to the vehicle virtual position to be parked in the image of the vehicle according to the central axis of the vehicle and the vehicle virtual position to be parked.

In addition, the auxiliary parking system provided by the embodiment of the present disclosure includes the above-mentioned auxiliary parking apparatus provided by the embodiment of the present disclosure and a plurality of radio frequency identification transmitters distributed in the parking area.

According to the auxiliary parking method, apparatus and system provided by the embodiments of the present disclosure, upon determining that the vehicle image acquisition mode is started, the plurality of radio frequency signals synchronously transmitted by the at least two radio frequency identification transmitters distributed in the parking area are received in real time, and the radio frequency signals include identification information of the radio frequency identification transmitters; after that, the current position of the vehicle in the parking area can be determined according to the radio frequency signals as received; finally, information identifying the vehicle virtual position to be parked is displayed in the image of the vehicle according to the current position of the vehicle in the parking area as determined and according to all available vehicle virtual positions in the parking area as predetermined, so as to achieve the effect of guiding a driver of the vehicle to carry out standard parking according to the information of the vehicle virtual position, and hence to make full use of the space in the parking area.

From the above description of the embodiments, those skilled in the art can clearly understand that the embodiments of the present disclosure can be implemented by hardware or by software plus necessary general-purpose hardware platforms. Based on this understanding, the technical solution of the embodiments of the present disclosure can be embodied in the form of a software product, which can be stored in a non-volatile storage medium (which can be a CD-ROM, a U disk, a mobile hard disk, etc.), and includes several instructions to cause a computer apparatus (which can be a personal computer, a server, or a network apparatus, etc.) to perform the methods described in the embodiments of the present disclosure.

Those skilled in the art can understand that the drawings are only schematic diagrams of preferred embodiment(s), and the modules or processes in the drawings are not necessary to implement the present disclosure.

Those skilled in the art can understand that the modules in the apparatus of the embodiments can be distributed in the apparatus of the embodiments according to the description of the embodiments, or corresponding changes can be made in one or more apparatus different from that in the embodiments. The modules of the above embodiments may be combined into one module or further split into a plurality of sub-modules.

The above serial numbers of the embodiments of the present disclosure are only for description and do not represent the priority of these embodiments.

Obviously, those skilled in the art can make various changes and modifications to the present disclosure without departing from the spirit and scope of the present disclosure. Thus, the present disclosure is also intended to include such modifications and variations provided if such modifications and variations provided fall within the scope of the claims of the present disclosure and their equivalents.

The present application claims the benefits of Chinese patent application No. 201710764687.X, which was filed on Aug. 30, 2017 and is fully incorporated herein by reference as part of the embodiments of this application.

What is claimed is:

1. An auxiliary parking method, comprising:
   starting a vehicle image acquisition mode;
   receiving a plurality of radio frequency signals synchronously transmitted by at least two radio frequency identification transmitters distributed in a parking area in real time;
   determining a current position of a vehicle in the parking area according to the plurality of radio frequency signals as received; and
   displaying information identifying a vehicle virtual position to be parked in an image of the vehicle according to the current position of the vehicle in the parking area as determined and at least one available vehicle virtual position in the parking area.

2. The auxiliary parking method according to claim 1, wherein the number of the radio frequency identification transmitters is greater than two,
   determining the current position of the vehicle in the parking area according to the plurality of radio frequency signals as received comprises:
   determining signal receiving time differences between a first one of the plurality of radio frequency signals as received and subsequent ones of the plurality of radio frequency signals as received among the plurality of radio frequency signals synchronously transmitted by the at least two radio frequency identification transmitters; and
   determining the current position of the vehicle in the parking area according to the signal receiving time differences as determined.

3. The auxiliary parking method according to claim 2, wherein the plurality of radio frequency signals comprise identification information of the at least two radio frequency identification transmitters, determining the current position of the vehicle in the parking area according to the signal receiving time differences as determined comprises:
  determining distance differences between the current position of the vehicle and the at least two radio frequency identification transmitters corresponding to the signal receiving time differences according to the signal receiving time differences as determined and identification information of the at least two radio frequency identification transmitters;
  determining hyperbolas corresponding to the distance differences according to position information corresponding to the identification information of the at least two radio frequency identification transmitters of the plurality of radio frequency signals and according to the distance differences; and
  taking an average value of intersection positions of the hyperbolas corresponding to the distance differences as the current position of the vehicle.

4. The auxiliary parking method according to claim 3, wherein determining the current position of the vehicle in the parking area according to the plurality of radio frequency signals as received comprises:
  determining current positions of a head portion and a tail portion of the vehicle in the parking area according to the plurality of radio frequency signals received by the head portion and the tail portion of the vehicle.

5. The auxiliary parking method according to claim 2, wherein determining the current position of the vehicle in the parking area according to the plurality of radio frequency signals as received comprises:
  determining current positions of a head portion and a tail portion of the vehicle in the parking area according to the plurality of radio frequency signals received by the head portion and the tail portion of the vehicle.

6. The auxiliary parking method according to claim 1, wherein the plurality of radio frequency signals further comprise sending time identification information of the at least two radio frequency identification transmitters,
  determining the current position of the vehicle in the parking area according to the plurality of radio frequency signals as received comprises:
  determining signal receiving times of the plurality of radio frequency signals as received;
  determining signal transmission times of the plurality of radio frequency signals according to the sending time identification information of the at least two radio frequency identification transmitters comprised in the plurality of radio frequency signals and according to the signal receiving times of the plurality of radio frequency signals; and
  determining the current position of the vehicle according to the signal transmission times of the plurality of radio frequency signals as determined.

7. The auxiliary parking method according to claim 6, wherein determining the current position of the vehicle according to the signal transmission times of the plurality of radio frequency signals as determined comprises:
  determining transmission distances of the plurality of radio frequency signals according to the signal transmission times of the plurality of radio frequency signals as determined;
  determining circular arc curves corresponding to the plurality of radio frequency signals by taking position information corresponding to identification information of the at least two radio frequency identification transmitters of the plurality of radio frequency signals as origins and by taking the transmission distances of the plurality of radio frequency signals as radiuses; and
  taking an average value of intersection positions of the circular arc curves corresponding to the plurality of radio frequency signals as the current position of the vehicle.

8. The auxiliary parking method according to claim 7, wherein determining the current position of the vehicle in the parking area according to the plurality of radio frequency signals as received comprises:
  determining current positions of a head portion and a tail portion of the vehicle in the parking area according to the plurality of radio frequency signals received by the head portion and the tail portion of the vehicle.

9. The auxiliary parking method according to claim 6, wherein determining the current position of the vehicle in the parking area according to the plurality of radio frequency signals as received comprises:
  determining current positions of a head portion and a tail portion of the vehicle in the parking area according to the plurality of radio frequency signals received by the head portion and the tail portion of the vehicle.

10. The auxiliary parking method according to claim 1, wherein determining the current position of the vehicle in the parking area according to the plurality of radio frequency signals as received comprises:
  determining current positions of a head portion and a tail portion of the vehicle in the parking area according to the plurality of radio frequency signals received by the head portion and the tail portion of the vehicle.

11. The auxiliary parking method according to claim 10, further comprising:
  determining a central axis of the vehicle according to the current positions of the head portion and the tail portion of the vehicle in the parking area; and
  displaying an identification offset line of the vehicle with relative to the vehicle virtual position to be parked in the image of the vehicle according to the central axis of the vehicle and the vehicle virtual position to be parked.

12. An auxiliary parking apparatus, comprising:
  a camera, configured to acquire an image of a vehicle upon a vehicle image acquisition mode being started;
  a radio frequency tag, configured to receive a plurality of radio frequency signals synchronously transmitted by a plurality of radio frequency identification transmitters distributed in a parking area in real time upon determining that the vehicle image acquisition mode is started; and
  a processor, configured to start the vehicle image acquisition mode, determine a current position of the vehicle in the parking area according to the plurality of radio frequency signals as received, and display information identifying a vehicle virtual position to be parked in an image of the vehicle according to the current position of the vehicle in the parking area as determined and at least one available vehicle virtual position in the parking area.

13. The auxiliary parking apparatus according to claim 12, wherein upon the number of the radio frequency identification transmitters being greater than two, the processor is further configured to determine signal receiving time differences between a first one of the plurality of radio frequency signals as received and subsequent ones of the plurality of radio frequency signals as received among the plurality of radio frequency signals synchronously transmitted by the plurality of radio frequency identification transmitters.

14. The auxiliary parking apparatus according to claim 13, wherein the radio frequency signal comprises: identification information of the radio frequency identification transmitter;

wherein the processor is further configured to: determine distance differences between the current position of the vehicle and the plurality of radio frequency identification transmitters corresponding to the signal receiving time differences according to the signal receiving time differences as determined and identification information of the plurality of radio frequency identification transmitters; determine hyperbolas corresponding to the distance differences according to position information corresponding to the identification information of the plurality of radio frequency identification transmitters of the plurality of radio frequency signals and according to the distance differences; and taking an average value of intersection positions of the hyperbolas corresponding to the distance differences as the current position of the vehicle.

15. The auxiliary parking apparatus according to claim 13, wherein the radio frequency tag is located at a head portion and a tail portion of the vehicle, respectively;

the processor is configured to determine current positions of the head portion and the tail portion of the vehicle in the parking area according to the plurality of radio frequency signals received by the head portion and the tail portion of the vehicle.

16. The auxiliary parking apparatus according to claim 12, wherein upon the number of the plurality of radio frequency identification transmitters being greater than one and the plurality of radio frequency signals comprising sending time identification information of the plurality of radio frequency identification transmitters, the processor is further configured to: determine signal receiving times of the plurality of radio frequency signals as received; determine signal transmission times of the plurality of radio frequency signals according to the sending time identification information of the plurality of radio frequency identification transmitters comprised in the plurality of radio frequency signals and according to the signal receiving times of the plurality of radio frequency signals; and determine the current position of the vehicle according to the signal transmission times of the plurality of radio frequency signals as determined.

17. The auxiliary parking apparatus according to claim 16, wherein the processor is further configured to: determine transmission distances of the plurality of radio frequency signals according to the signal transmission times of the plurality of radio frequency signals as determined; determine circular arc curves corresponding to the plurality of radio frequency signals by taking position information corresponding to identification information of the plurality of radio frequency identification transmitters of the plurality of radio frequency signals as origins and by taking the transmission distances of the plurality of radio frequency signals as radiuses; and take an average value of intersection positions of the circular arc curves corresponding to the plurality of radio frequency signals as the current position of the vehicle.

18. The auxiliary parking apparatus according to claim 12, wherein the radio frequency tag is located at a head portion and a tail portion of the vehicle, respectively;

the processor is configured to determine current positions of the head portion and the tail portion of the vehicle in the parking area according to the plurality of radio frequency signals received by the head portion and the tail portion of the vehicle.

19. The auxiliary parking apparatus according to claim 18, wherein the processor is further configured to: determine a central axis of the vehicle according to the current positions of the head portion and the tail portion of the vehicle in the parking area; and display an identification offset line of the vehicle with relative to the vehicle virtual position to be parked in the image of the vehicle according to the central axis of the vehicle and the vehicle virtual position to be parked.

20. An auxiliary parking system, comprising: the auxiliary parking apparatus according to claim 12 disposed in a vehicle, and a plurality of radio frequency identification transmitters distributed in a parking area.

\* \* \* \* \*